United States Patent
Kizelshteyn et al.

(10) Patent No.: US 11,386,138 B2
(45) Date of Patent: Jul. 12, 2022

(54) MEDIA CONTENT SELECTED FROM LISTENING HISTORY OF SOCIAL CONNECTIONS

(71) Applicant: Spotify AB, Stockholm (SE)

(72) Inventors: Mark Kizelshteyn, Brooklyn, NY (US); Paul Lamere, Bath, ME (US); Tracey Churray, New York, NY (US); Samit Patel, Weehawken, NJ (US); Jessica Aleksandrowicz, New York, NY (US); Ercan Erden, Brooklyn, NY (US); Juan Rivero, New York, NY (US); Joseph Levin, Brooklyn, NY (US); Christine Yokoyama, Portland, OR (US)

(73) Assignee: Spotify AB, Stockholm (SE)

(*) Notice: Subject to any disclaimer, the term of this patent is extended or adjusted under 35 U.S.C. 154(b) by 0 days.

(21) Appl. No.: 17/206,282

(22) Filed: Mar. 19, 2021

(65) Prior Publication Data
US 2021/0311982 A1 Oct. 7, 2021

Related U.S. Application Data

(63) Continuation of application No. 16/259,860, filed on Jan. 28, 2019, now Pat. No. 10,977,296.

(60) Provisional application No. 62/780,061, filed on Dec. 14, 2018.

(51) Int. Cl.
| | |
|---|---|
| *G06F 16/438* | (2019.01) |
| *G06F 16/435* | (2019.01) |
| *H04L 65/612* | (2022.01) |
| *H04L 67/306* | (2022.01) |

(Continued)

(52) U.S. Cl.
CPC ........ *G06F 16/4387* (2019.01); *G06F 16/433* (2019.01); *G06F 16/435* (2019.01); *H04L 65/4076* (2013.01); *H04L 65/4084* (2013.01); *H04L 67/306* (2013.01)

(58) Field of Classification Search
CPC .......................... G06F 16/432–16/435; H04L 65/4069–65/4084; H04L 67/30–67/306
See application file for complete search history.

(56) References Cited

U.S. PATENT DOCUMENTS

| | | | | |
|---|---|---|---|---|
| 7,747,620 | B2 | 6/2010 | Beaupre | |
| 9,158,819 | B2 * | 10/2015 | Lunt | ............... G06Q 30/0275 |
| 10,474,422 | B1 * | 11/2019 | Venti | ................ G06F 16/635 |

(Continued)

OTHER PUBLICATIONS

Chenxi Fan et al., "Social Network Mining for Recommendation of Friends Based on Music Interests", 2018, IEEE/ACM International Conference on Advances in Social Networks Analysis and Mining (ASONAM), pp. 833-840 (Year: 2018).*

(Continued)

*Primary Examiner* — Clayton R Williams
(74) *Attorney, Agent, or Firm* — Merchant & Gould P.C.

(57) ABSTRACT

Methods, systems, and computer programs for generating a playlist of media content items that are popular with the friends of the first user. A first user taste profile is determined and a user taste profile is determined for each of a plurality of social connections. A similarity score is calculated between the first user taste profile and the user taste profile of each social connection. Media content items consumed by social connections with the highest similarity score are selected and placed in a playlist for the first user.

20 Claims, 11 Drawing Sheets

(51) Int. Cl.
*H04L 65/611* (2022.01)
*G06F 16/432* (2019.01)

(56) References Cited

U.S. PATENT DOCUMENTS

| | | | |
|---|---|---|---|
| 10,977,296 B1 | 4/2021 | Kizelshteyn | |
| 2011/0125763 A1 | 5/2011 | Takanen et al. | |
| 2012/0078957 A1* | 3/2012 | Galbreath | H04L 67/10 707/769 |
| 2013/0031216 A1 | 1/2013 | Willis et al. | |
| 2014/0032676 A1* | 1/2014 | Partovi | H04L 67/22 709/204 |
| 2014/0281978 A1 | 9/2014 | Ye | |
| 2015/0331940 A1* | 11/2015 | Manning | G06F 16/639 707/740 |
| 2018/0307751 A1* | 10/2018 | Lim | G06F 16/683 |
| 2019/0028748 A1* | 1/2019 | Depies | H04L 65/4084 |

OTHER PUBLICATIONS

Ciocca, Sophia, "How Does Spotify Know You So Well?", https://medium.com/s/story/spotifys-discover-weekly-how-machine-learning-finds-your-new-music-19a41ab76efe, downloaded on Jan. 29, 2019, dated Oct. 10, 2017, 17 pages.
Pasick, Adam, "The magic that makes Spotify's Discover Weekly playlists so damn good", https://qz.com/571007/the-magic-that-makes-spotifys-discover-weekly-playlists-so-damn-good/, downloaded on Apr. 1, 2019, dated Dec. 21, 2015, 18 pages.
Deahl, Dani, "Spotify is testing a new personalized playlist featuring your friends' favorite songs", https://www.theverge.com/2018/5/9/17337182/spotify-testing-new-friends-weekly-playlist, downloaded on Apr. 1, 2019, dated May 9, 2018, 4 pages.
Brown, Eileen, "Wego Concerts app connects you to like-minded music friends- and lovers", https://www.zdnet.com/article/wego-concerts-app-connects-you-to-like-mind-ed-friends-and-lovers/, downloaded on Apr. 1, 2019, dated Feb. 20, 2015, 4 pages.
Powel, Karlie, "Spotify Rolls Out "Friends Weekly" Playlist to Connect users Through Music," https://www.youredm.com/2018/05/11/spotify-rolls-out-friends-weekly-playlist-to-connect-users-through-music/, downloaded on Apr. 1, 2019, dated May 11, 2018, 2 pages.
Reddit, "Spotify has introduced a Friends Weekly Playlist. And it's great so far!," https://www.reddit.com/r/spotify/comments/7y2kor/spotify_has_introduced_a_friends_weekly_playlist/, downloaded on Apr. 15, 2019, dated Feb. 16, 2018, 5 pages.
Spotify Community, "'Friends Weekly'?," https://community.spotify.com/t5/Other-Partners-Web-Player-etc/quot-Friends-Weekly-quot/td-p/4183542, downloaded on Apr. 15, 2019, dated Dec. 29, 2017, 4 pages.
Twitter, "Meghan Stephens on Twitter: 'okay@Spotify I was skeptical of Friends Weekly but as per fkn usual the algo is On Point'," https://twitter.com/meghannn/status/965963809180602369, downloaded on Apr. 16, 2019, dated Feb. 20, 2018, 2 pages.
Twitter, "friends weekly from:sincerelylydia," https://twitter.com/search?l=&q=friendsweeklyfrom%3Asincerelylydia&src=typd, downloaded on Apr. 16, 2019, dated Feb. 1, 2018 and Mar. 15, 2018, 2 pages.
Know Techie, "Spotify's Friends Weekly will make sure you know the terrible music tastes your friends have," https://knowtechie.com/spotifys-friends-weekly-will-make-you-know-what-terrible-music-tastes-your-friends-have/, downloaded on Apr. 16, 2019, dated May 10, 2018, 4 pages.
Twitter, "Josh Constine on Twitter: 'Spotify/music apps should turn photos of our CD collections into playlists, and offer a "Friends Weekly" playlist of recommendations & frequent listens from your pals'," https://twitter.com/JoshConstine/status/1077643033183698945, downloaded on Apr. 16, 2019, dated Dec. 25, 2018, 1 page.
Twitter, "9to5Google.com on Twitter: 'Spotify for Android tests new "Friends Weekly" feature, revamped Now Playing UI I by @nexusben'," https://twitter.com/9to5Google/status/1035167139156688896, downloaded on Apr. 16, 2019, dated Aug. 30, 2018, 1 page.
Twitter, "Valentina Ferreira on Twitter: Listening to "Friends Weekly" is like sharing in bits of my friends heart and I love bits and I love my friends," dated Dec. 18, 2017, 1 page.
Facebook, Ebony Rose on Facebook: "Yooooo Spotify . . . ", applicant admitted as posted on Facebook prior to the application filed, 1 page.
Spotify, User Interface Screenshots, illustrating an experimental test of a first version of the Friends Weekly feature that was temporarily released to a subset of Spotify users on Dec. 4, 2017, 2 pages.

* cited by examiner

| Track_uri | Number of Overall Plays | Unique Track Listeners | Activity Score |
|---|---|---|---|
| Spotify:track:7aikjds9230jfj695adsfjj | 82,137,045 | 5,475,803 | 76 |
| Spotify:track:jadsf9734683jakljk85603 | 100,790,660 | 5,039,533 | 82 |
| Spotify:track:5896nmkfoi867mfk86mf | 45,261,299 | 4,526,128 | 73 |
| Spotify:track:jf86jf45889jfhg5423jfiowa | 938,253,154 | 37,530,126 | 95 |

Figure 9

| Track_uri | Personalization Score | Familiarity Score | Repeat OR Too Many by Same Artist |
|---|---|---|---|
| Spotify:track:7aIkjds9230fjl695adsfjl | 53 | 98 | NO |
| Spotify:track:75369vnmzjxsd558dcxa65 | 65 | 89 | NO |
| Spotify:track:jf86jf45889jfhg5423jfiowa | 92 | 85 | YES |
| Spotify:track:5896nmkfoi867mfk86mf | 64 | 70 | NO |
| Spotify:track:jadsf9734683jakljk85603 | 88 | 62 | NO |
| Spotify:track:jadsf5933jak856gssdpq98 | 74 | 54 | NO |
| Spotify:track:58qpjzm008340mmmlfp | 51 | 36 | YES |

Figure 11

MEDIA CONTENT SELECTED FROM LISTENING HISTORY OF SOCIAL CONNECTIONS

CROSS-REFERENCE TO RELATED APPLICATION(S)

This application is a continuation of U.S. patent application Ser. No. 16/259,860, entitled, "MEDIA CONTENT SELECTED FROM LISTENING HISTORY OF SOCIAL CONNECTIONS," filed Jan. 28, 2019, which claims the benefit of U.S. Provisional Application No. 62/780,061, entitled, "Systems and Method for Selecting Media Content," filed Dec. 14, 2018, which applications are hereby incorporated by reference in their entireties.

BACKGROUND

Media distribution platforms, such as those that stream content across the Internet, have allowed consumers unprecedented access to large catalogs of media content including music and videos. Because there is now so much media content available to consumers, it can be difficult for consumers to determine what media content to listen to or watch.

As a result, such media distribution platforms have developed various features to assist users in identifying suitable content. Such features might recommend content that is of a particular style or genre, for example. More advanced features can analyze the user's past usage and make recommendations of other media content that is similar to or matches certain characteristics of media content previously consumed by that user. Even so, additional features are desired to assist users in identifying media content of interest to allow them to make even better use of the large catalogs available to them.

SUMMARY

In general terms, the present disclosure is directed to a media system. In some embodiments, the media system generates a queue of media content items based on the media consumption history of other users of the media delivery system, such as to allow the user to explore media content that is enjoyed by his or her friends or other social connections. In an example embodiment, and by non-limiting example, a playlist is generated that is composed of media content items selected from the listening history of the user's social connections.

One aspect is a method of generating a queue of media content items from social connections for playback to a first user using a media system, the media system including at least one computing device, the method comprising: determining a first user taste profile; identifying social connections of the first user; determine a user taste profile for each of the social connections, each of the user taste profiles being generated based at least in part on listening history of the respective social connection; comparing the first user taste profile with the user taste profiles of the social connections to generate a similarity score for each of the social connections, the similarity score representing how similar the first user taste profile is to the user taste profile of the social connection; selecting a subset of the social connections based on the similarity scores; identifying a plurality of media content items previously consumed by the subset of the social connections; and generating the queue of media content items selected from the plurality of media content items.

Another aspect is a media system comprising at least one processing system and at least one non-transitory computer-readable medium storing data instructions that, when executed by the processor, cause the processor to: receive a request from a first user to generate a queue of media content items based on the first user's social connections; determine a first user taste profile; identify the social connections of the first user determine a user taste profile for each of the social connections, each of the user taste profiles being generated based at least in part on listening history of the respective social connection; compare the first user taste profile with the user taste profiles of the social connections to generate a similarity score for each of the social connections, the similarity score representing how similar the first user taste profile is to the user taste profile of the social connection; select a subset of the social connections from the social connections based on the similarity scores; identify a plurality of media content items previously consumed by the subset of the social connections; and generate the queue of media content items selected from the plurality of media content items.

A further aspect is a method of generating a queue of media content items from social connections of a first user for playback to a first user using a media system including at least one computing device, the method comprising: determining a first user taste profile; identifying a plurality of social connections of the first user; determining a user taste profile for each of the social connections, the user taste profiles being generated based at least in part on listening histories of the social connections; comparing the first user taste profile with the user taste profiles of the social connections to generate similarity scores for the social connections, the similarity scores representing how similar the first user taste profile is to the user taste profiles of the social connections; selecting a subset of social connections from the plurality of social connections based on the similarity scores; checking privacy settings associated with the social connections to determine whether the privacy settings indicate that any of the social connections of the subset of social connections have elected not to share their listening histories; identifying a plurality of media content items consumed by the subset of the social connections; and generating the queue of media content items selected from the plurality of media content items, wherein the queue of media content items does not include media content items identified from social connections that have elected not to share their listening histories.

BRIEF DESCRIPTION OF THE DRAWINGS

FIG. 9 shows an example list of tracks to calculate an activity score.

FIG. 11 shows an example list of tracks sorted by familiarity score.

DETAILED DESCRIPTION

Figure 1:
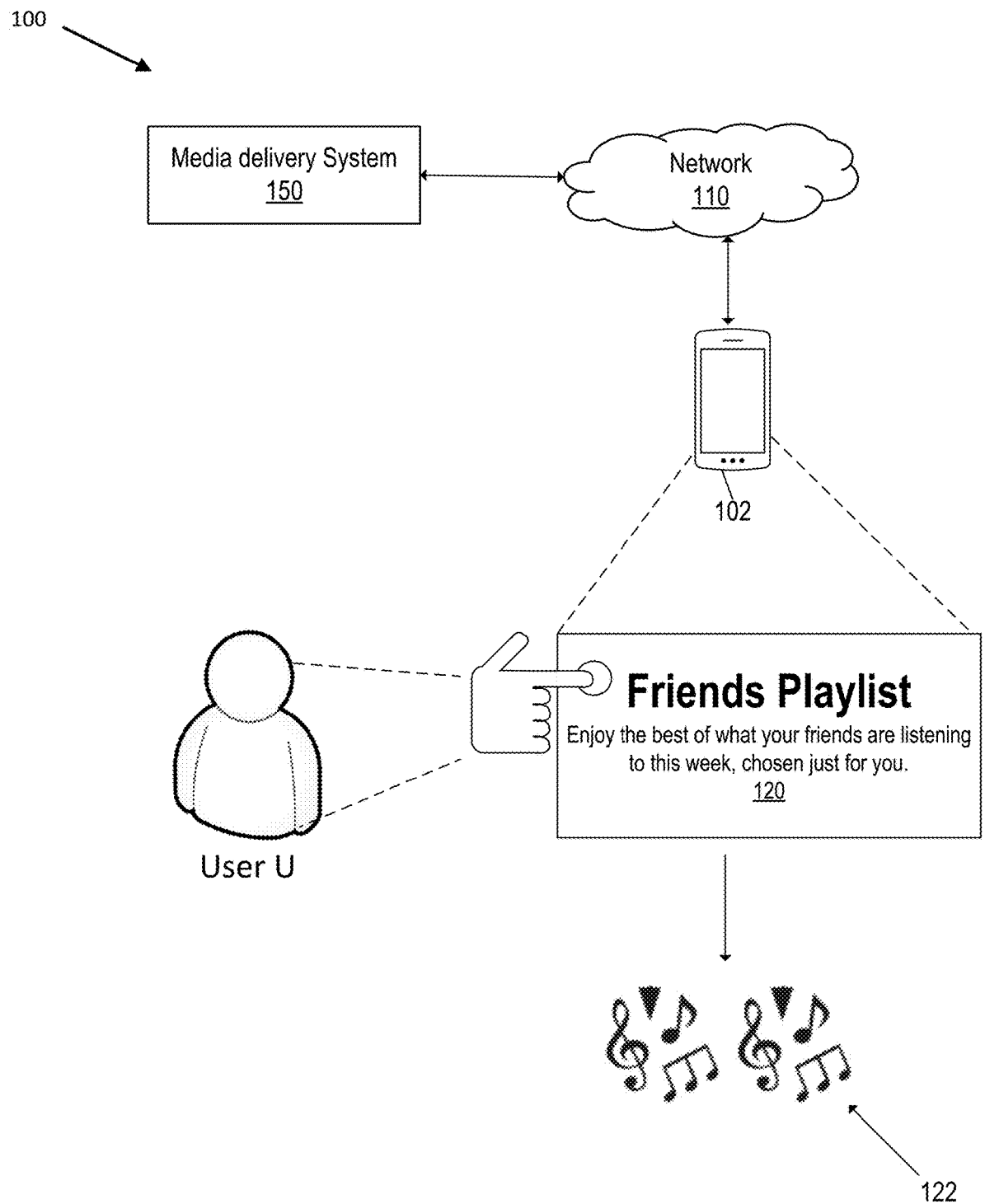
FIG. 1 is a schematic block diagram illustrating an example media system, such as for generating and playing to a first user a queue of media content items, such as a friends playlist.

Various embodiments are described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The system and method are generally directed towards procuring and generating a queue of media content items that are derived from the listening history of other users that the first user follows on a media delivery service. As used herein, the term "user" denotes other users on the same media system that the first user is connected to, the term "friend" refers to users on a social media system that the first user is connected to on the associated social media system, generally, a user and/or a friend may be referred to as a "social connection," and the term "followed user" refers to users on the media streaming service that the first user follows.

As described herein, consuming media content items may include one or more of listening to audio content, watching video content, or consuming other types of media content. For ease of explanation, the embodiments described in this application are presented using specific examples. For example, audio content (and in particular music) is described as an example of one form of media consumption, and examples commonly refer to "songs" or "tracks" that are representative of media content items.

Media content items can include audio and video content. Examples of audio content include songs, albums, playlists, radio stations, podcasts, audiobooks, and other audible media content items. Examples of video content include movies, music videos, television programs, and other visible media content items. In many cases, video content also includes audio content.

Many users desire a personalized media consuming experience. For example, a user can access almost limitless catalogs of media content items through various free or fee-based media delivery services, such as media streaming services. Users can use mobile devices or other media playback devices to access large catalogs of media content items. Due to such large collections of media content items, it is desired to introduce users to new media content items that the user will most likely enjoy. Without providing recommendations to the user, it is unlikely that the user will find such media content items on their own. Further, users are aware of what their friends are listening to, which may create other opportunities to go to concerts or listen to music together, and to build stronger connections with social connections and with the media system.

FIG. 1 is schematic block diagram illustrating an example media system 100, such as for generating and playing to a first user U a queue of media content items, such as a friends playlist 120. In this example, the media system 100 includes a user device 102 and a media delivery system 150. The media system 100 can communicate over a network 110.

The friends playlist 120 is one example of a queue of media content items, which is generated by the media system from the first user's social connections, or from another set of users having an identified relationship to (such as a personal relationship with) the first user U. Although the present disclosure utilizes the example of the friends playlist 120, it should be recognized that this is just one example of a queue of media content items. Other queues of media content items can also be generated for and/or played to the first user according to the principles described herein. For example, the queue can be generated based on other known relationships, such as colleagues, family members, club or group members, users that the first user follows, users who follow the first user, and other relationships. As another example, the queue of media content items can be another collection of media content items other than a playlist, such as a set of search results, a media stream, etc.

In some embodiments the friends playlist 120 is generated based on the first user's social connections. The social connections can be defined within the media system 100, or can be provided by and imported from another social media system or other database identifying relationship between users. Further examples are described herein, such as utilizing a social media system 160 described with reference to FIG. 2.

Figure 8:
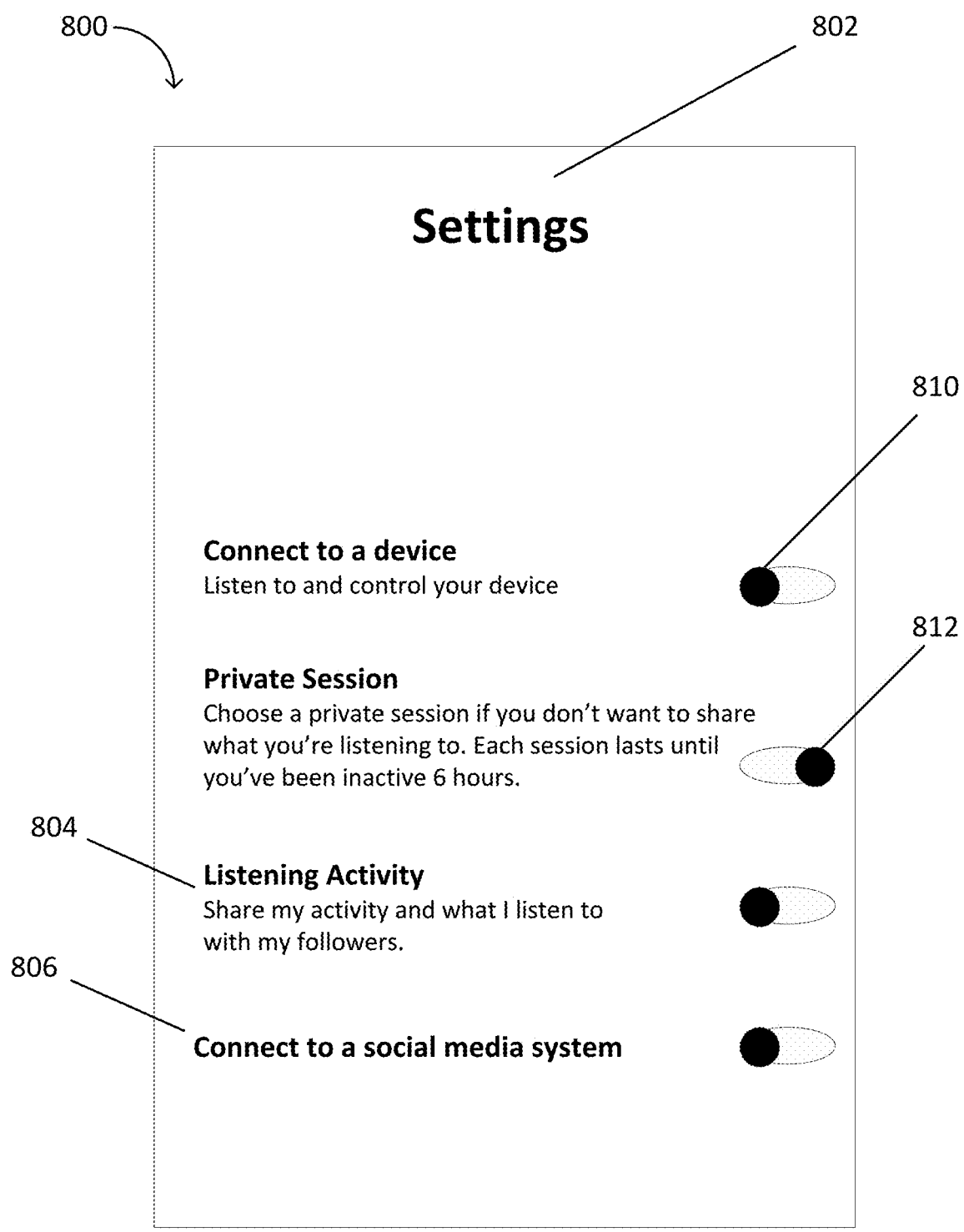
FIG. 8 shows an example user interface of a privacy settings display.

In all cases, the privacy of users is carefully protected by the media system 100. For example, obtaining a list of social connections from a social media system is completed only after the first user has expressly requested and authorized the media system 100 to obtain that information, which is confirmed by both the social media system and the media system 100. Additionally, even after a list of social connections has been obtained, the media system 100 does not use that information to generate the friends playlist 120 without the authorization of each user. For example, privacy controls, such as described in further detail with reference to FIG. 8 are provided that allow a user to maintain control over whether or not the media system 100 can use his or her listening history data to generate the friends playlist 120, and such controls can be adjusted by the users at any time.

Figure 2:
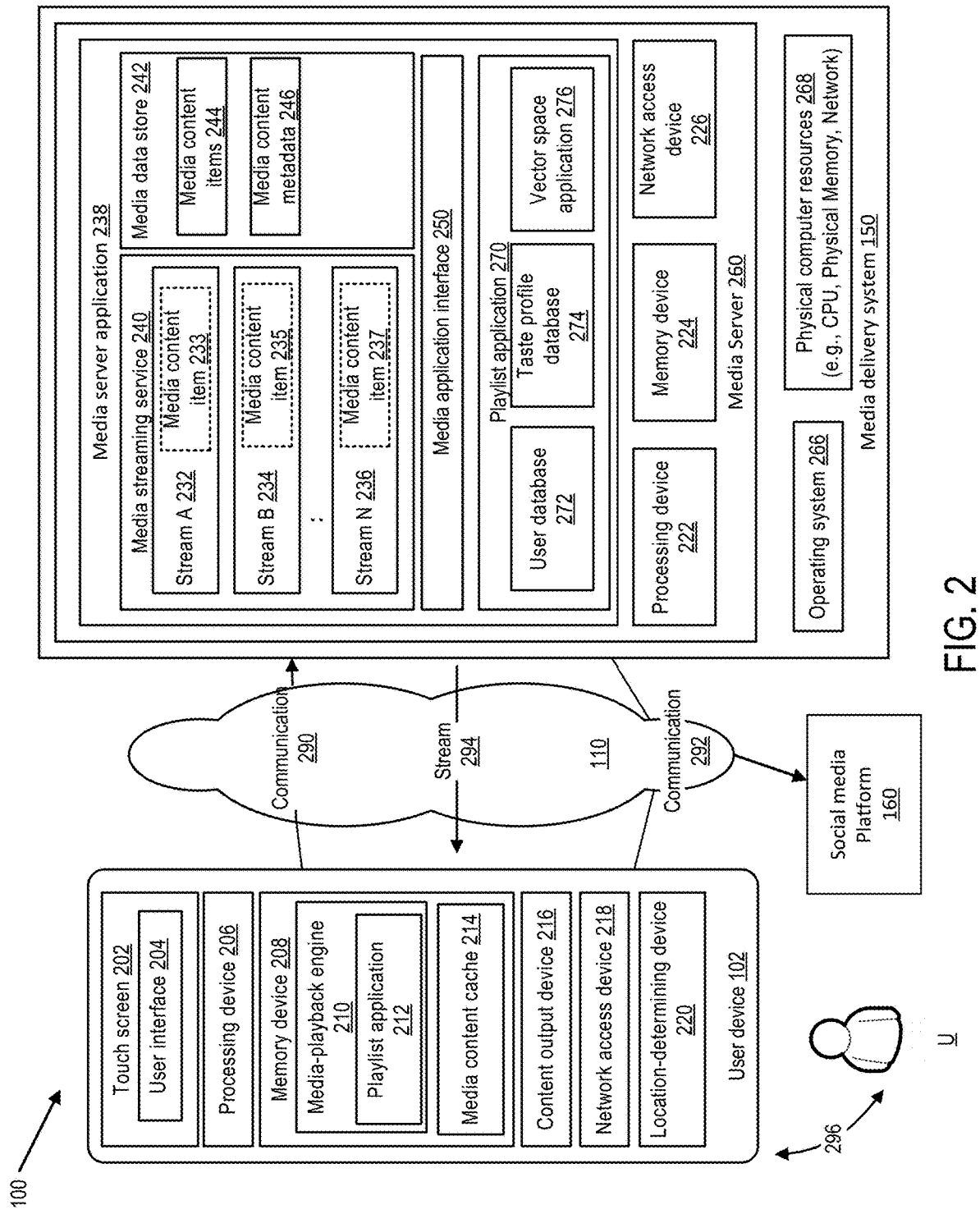
FIG. 2 is a schematic block diagram of another example of the media system 100 used to generate and play the friends playlist shown in FIG. 1.

The schematic display shown in FIG. 1 includes an example announcement window that can be generated on the user device 102, such as within a user interface of a media playback engine (e.g., 210, FIG. 2). The announcement window can be used to announce the availability of the friends playlist feature to the first user, and to prompt the user as to whether the user would like the media system 100 generate the friends playlist 120. In another possible embodiment the friends playlist 120 can be previously generated and the announcement window prompts the user to indicate whether he or she would like to listen to it. If so, a selectable control receives an input from the first user to initiate generation and/or playing of the friends playlist 120.

The media system 100 then provides the friends playlist 120 to the user device 102 where it is played 122 to the first user.

The user device 102 receives input from a user U and provides output, such as playing media content items 122 to the user U. The user device 102 can include visual components (e.g., displays for output and cameras for input), audio components (e.g., speakers for output and microphones for input), tactile components (e.g., haptic feedback actuators for output and buttons for input), and combinations thereof.

Network 110 is any suitable type of wireless or wired data communication network or other communication network, and can include a combination of data communication networks. Examples of network 110 include the Internet, an intranet, a wide area network (WAN), a local area network (LAN), a virtual private network (VPN), cellular network connections, and connections made using protocols such as 802.11a, b, g, n, and/or ac.

The media delivery system 150 includes one or more computing devices, such as one or more servers. In many examples, the media delivery system 150 is a media content provider (e.g., a media streaming service). In an example the media delivery system 150 transmits media content items to the user device 102 for playback, such as by streaming, progressively downloading, downloading, or other forms of communication of media content items.

In some instances, media delivery system 150 includes multiple server devices. The multiple server devices can be owned, managed, and/or controlled by the same or separate entities. Various actions performed by one or more servers can include analyzing user communications, performing party-specific actions, accessing and/or transmitting media content, and the like. As an example, a first server is specific to user device 102 manufacturer, receives, and processes communications from user U. That first server can determine whether certain communications relate to third party software and can transmit those communications to a second server that is specific to the third party software. Media delivery system 150 can include a media streaming application that includes a playlist application, which is described in more detail below.

It should be appreciated that the user device 102 need not be a single physical unit or structure but could itself comprise a system of one or more of interconnected hardware, firmware, and software. Thus, for example, the user device 102 corresponds to a combination of a smart phone or specialized hand-held device that is connected (through a hard connection or wireless connection) to an automobile's speakers. In other examples, the user device 102 is communicatively linked or linkable to hardware (e.g., an external speaker, a smart television, an audio system, etc.) in another user environment such as a home, an office, another vehicle, any location where media playback could be desirable, etc.

In some embodiments, the user device 102 is a computing device, handheld entertainment device, smartphone, tablet, watch, wearable device, or any other type of device capable of playing media content. In yet other embodiments, the user device 102 is an in-dash vehicle computer, laptop computer, desktop computer, television, gaming console, set-top box, network appliance, BLU-RAY DISC player, DVD player, media player, stereo, or radio.

User device 102 communicates with a network 110 and network 110 communicates with media delivery system 150. Media delivery system 150 and network 110 are described in more detail at FIG. 2 below. The media system 100 can also communicate with other systems or computing devices through network 110, such as to a social media system described in more detail below.

FIG. 2 is a schematic block diagram of another example of the media system 100 used to generate and play the friends playlist 120 shown in FIG. 1. In FIG. 2, the first user U, the user device 102, the media delivery system 150, and the network 110 are shown, as well as a social media system 160.

In the illustrated example, the user device 102 includes a touch screen 202, user interface 204, processing device 206, memory device 208, content output device 216, network access device 218, and location-determining device 220. The example memory device includes a media-playback engine 210, having a playlist application 212, and a media content cache 214.

Also in the illustrated example, the media delivery system 150 includes a media server 260, operating system 266, and physical computer resources 268. The example media server 260 includes a media server application 238, a processing device 222, a memory device 224, and a network access device 226. The example media server application 238 includes a media streaming service 240 (with streams 232, 234, and 236 of media content items 233, 235, and 237), media data store 242 (with media content items 244 and media content metadata 246), media application interface 250, and playlist application 270. The example playlist application 270 includes a user database 272, taste profile database 274, and vector space application 276. The media system 100 can include more or fewer components than those illustrated in this example.

User device 102 can issue requests to access media content at a media server 260, for example, to stream music, video, or other forms of media content to user device 102. In response, the media server 260 can populate a media content buffer with corresponding items of media content. The media server 260 can also communicate the selected media content to user device 102. Alternatively, in some embodiments, the user device 102 plays media content items stored locally on the user device 102. Further, in at least some embodiments, the user device 102 plays media content items that are stored locally as well as media content items provided by other systems.

Although for purposes of illustration, a user device 102 and media server 260 are shown, media delivery system 150 can support simultaneous use of a plurality of user devices 102. Similarly, user device 102 can access media content items 233, 235, 237 provided by a plurality of media servers 260, or switch between different media streams 232, 234, 236 provided by one or more media servers 260.

In at least some embodiments, the user device 102 includes a touch screen 202, a processing device 206, a memory device 208, a content output device 216, a network access device 218, and a location-determining device 220. Other embodiments may include additional, different, or fewer components. For example, some embodiments do not include one or more of the location-determining device 220 or the touch screen 202.

The location-determining device 220 is a device that determines the location of the user device 102. In some embodiments, the location-determining device 220 uses one or more of the following technologies: Global Positioning System (GPS) technology that may receive GPS signals from satellites, cellular triangulation technology, network-based location identification technology, wireless network technology (e.g., WI-FI) positioning systems technology, and combinations thereof. In some embodiments the location-determining device 220 can be used to identify related users. For example, a current location of the first user U can be determined, and that current location can then be compared to the locations of other users to identify a proximal relationship between the first user and other users. For example, the current location can be used to determine that users are in a same room, building, facility, city, state, region, country, or continent.

The touch screen 202 operates to receive an input 296 from a selector (e.g., a finger, stylus, etc.) controlled by the user U. In some embodiments, the touch screen 202 operates as both a display device and a user input device. In some embodiments, the touch screen 202 detects inputs based on one or both of touches and near-touches. In some embodiments, the touch screen 202 displays a user interface 204 for interacting with the user device 102. As noted above, some embodiments do not include a touch screen 202. Some embodiments include a display device and one or more separate user interface devices. Further, some embodiments do not include a display device.

The user interface is adapted to display media options, for example as an array of media tiles, thumbnails, or other formats, and can determine a user interaction or input. Selecting a particular media option, for example a particular media tile or thumbnail, can be used as a command by a user and/or the media device, to the media server, to download, stream or otherwise access a corresponding particular media content item or stream of media content.

In some embodiments, the processing device 206 comprises one or more central processing units (CPU). In other embodiments, the processing device 206 additionally or alternatively includes one or more digital signal processors, field-programmable gate arrays, or other electronic circuits.

The memory device 208 operates to store data and instructions. In some embodiments, the memory device 208 stores instructions for a media-playback engine 210 that includes the playlist application 212. In some embodiments, the media-playback engine 210 selects and plays back media content and generates interfaces for selecting and playing back media content items.

In some embodiments the media-playback engine 210 includes a playlist application 212. Playlist application 212 interacts with the user through the user interface 204 of the user device 102. For example, when the user selects the announcement window shown in FIG. 1 of the user interface 204, a message is sent from the user device 204 to the playlist application of the media server 260 indicating that the user U wants it to generate and/or provide the friends playlist 120. The playlist application 212 communicates with media server application 238 to identify media content items that should be used to create the friends playlist 120. The playlist application 212 also communicates 292 with a social media system 160 as needed, and as described in more detail below.

The playlist application 270 includes one or more hardware and/or software components operative to provide periodically updated personalized playlist functionality. Playlist management functionality includes one or more of selecting users, selecting one or more individual songs, removing one or more individual songs, and playing playlists, among other functionality. In an example, the playlist application 270 receives a command from a first user and executes a command based thereon. Many operations performed by the playlist application 270 include interacting with a media server application 238. The playlist application 270 may also be located at the media server application 238, which is described in more detail below.

Playlist application 270 also includes functionality including communicating with a social media system 160 to receive a list of friends of the first user. Playlist application 270 determines which friends of the first user in the social media system are also users of the media streaming service. Those users and associated user information can be stored in the user database 272 of the playlist application 270. In an example, a friend list is imported from the social media system 160, and friends that are also users of the media streaming service automatically become followed users of the first user. Another example of operations that can be performed in whole or in part by the playlist application 270 are illustrated and described with reference to FIG. 3.

Some embodiments of the memory device 208 also include a media content cache 214. The media content cache 214 stores media content items, such as media content items that have been previously received from the media-delivery system 230. The media content items stored in the media content cache 214 may be stored in an encrypted or unencrypted format. The media content cache 214 can also store decryption keys for some or all of the media content items that are stored in an encrypted format. The media content cache 214 can also store metadata about media content items such as title, artist name, album name, length, genre, mood, era, etc. The media content cache 214 can also store playback information about the media content items, such as the number of times the user has requested to playback the media content item or the current location of playback (e.g., when the media content item is an audiobook, podcast, or the like from which a user may wish to resume playback).

The memory device 208 typically includes at least some form of computer-readable media. Computer readable media include any available media that can be accessed by the user device 102. By way of example, computer-readable media include computer readable storage media and computer readable communication media.

Computer readable storage media is hardware and includes, for example, volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, BLU-RAY DISCS, digital versatile discs or other optical storage, magnetic cassettes, magnetic tape, magnetic disk storage or other magnetic storage devices, or any other medium that can be used to store the desired information and that can be accessed by the user device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 216 operates to output media content. In some embodiments, the content output device 216 generates media output for the first user U. Examples of the content output device 216 include a speaker assembly comprising one or more speakers, an audio output jack, a BLUETOOTH transmitter, a display panel, and a video output jack. Other embodiments are possible as well. For example, the content output device 216 may transmit a signal through the audio output jack or BLUETOOTH transmitter that can be used to reproduce an audio signal by a connected or paired device such as headphones, speaker system, or vehicle head unit.

The network access device 218 operates to communicate with other computing devices over one or more networks, such as the network 110. Examples of the network access device include one or more wired network interfaces and wireless network interfaces. Examples of wireless network interfaces include infrared, BLUETOOTH wireless technology, 802.11a/b/g/n/ac, and cellular or other radio frequency interfaces.

The network 110 is an electronic communication network that facilitates communication between the user device 102 and the media delivery system 150. An electronic communication network includes a set of computing devices and links between the computing devices. The computing devices in the network use the links to enable communication among the computing devices in the network. The network 110 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 110 includes various types of links. For example, the network 110 can include wired and/or wireless links, including BLUETOOTH, ultra-wideband (UWB), 802.11, ZIGBEE, cellular, and other types of wireless links. Furthermore, in various embodiments, the network 110 is implemented at various scales. For example, the network 110 can be implemented as one or more vehicle are networks, local area networks (LANs), metropolitan area networks, subnets, wide area networks (such as the Internet), or can be implemented at another scale. Further, in some embodiments, the network 110 includes multiple networks, which may be of the same type or of multiple different types.

The media delivery system 150 comprises one or more computing devices and provides media content items to the user device 102 and, in some embodiments, other media-playback devices as well. The media delivery system 150 includes a media server 260. Although FIG. 2 shows a single media server 260, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

In some embodiments the media server 260 transmits stream media 294 to media-playback devices such as the user device 102. In some embodiments, the media server 260 includes a media server application 238, media application interface 250, playlist application 270, a processing device 222, a memory device 224, and a network access device 226. The processing device 222, memory device 224, and network access device 226 may be similar to the processing device 206, memory device 208, and network access device 218 respectively, which have each been previously described.

In some embodiments the media server application 238 streams music or other audio, video, or other forms of media content. The media server application 238 includes a media streaming service 240, a media data store 242, a media application interface 250, and a playlist application 270. The media streaming service 240 operates to buffer media content such as media content items 233, 235, and 237, for streaming to one or more streams 232, 234, and 236.

Media server 260 can provide a subscription-based media streaming service 240, for which user device 102 or user can have an associated account and credentials, and which enable the user device 102 to communicate with and receive content from the media server 260. A received media-access request from user device 102 can include information such as, for example, a network address, which identifies a user device 102 to which the media server 260 should stream or otherwise provide media content items 233, 235, 237, in response to processing the media-access request.

The media application interface 250 can receive requests or other communication from user device 102 or other systems, to retrieve media content items from the media server 260. For example, the media application interface 250 receives communication 290 from the media-playback engine 210.

In some embodiments, the media data store 242 stores media content items 244, media content metadata 246, and playlists 248. The media data store 242 may comprise one or more databases and file systems. As noted above, the media content items 244 may be audio, video, or any other type of media content, which may be stored in any format for storing media content.

Media content items 244 can include media content, for example, music, songs, videos, movies, or other media content, together with metadata describing that media content. The metadata can be used to enable users and user device 102 to search within repositories of media content, to locate particular media content items.

The media content metadata 246 operates to provide various information associated with the media content items 244. In some embodiments, the media content metadata 246 includes one or more of title, artist name, album name, length, genre, mood, era, etc.

The playlist application 270 can receive requests or other communication 290, 292 from user devices 102 or other systems to create and/or retrieve a playlist for playback. In some embodiments, playlist application 270 includes a user database 272, taste profile database 274, and vector space application 276. Playlist application 270 gathers information pertinent to generating a friends playlist 120, and operates to generate the friends playlist 120. Once the corresponding list of media content items is selected for the friends playlist 120, the media streaming service 240 transmits the media content items (e.g. 233, 235, or 237) for playback at the user device 102.

User database 272 can store information related to registered users of the media system 100. For example, the user database 272 stores connection information of users that identifies social connections (e.g., friends, followers, or other social connections). In another embodiment, the playlist application 270 communicates with other social media systems to identify and/or recommend social connections, which are then added to and stored in the user database 272.

In an example, playlist application 270 communicates with a social media system 160 and requests a list of connections associated with the first user. The request can be in the form of an API call, for example. As discussed above, the request is only made after receiving express authorization from the first user, and the authorization is confirmed by both the media system 100 and the social media system. The social media system then sends the list of connections, which is received by and imported into the media system 100, and stored in the user database 272. In some embodiments those connections can subsequently be used by the playlist application 270 to be presented as suggestions to the first user of other users of the media streaming service who the first user may want to further interact with or make another connection with. Or, in another embodiment the media system 100 can automatically follow or otherwise establish a connection with all of the connections from the list of connections in the media system 100.

In some embodiments an additional matching process is performed after receipt of the list of connections in order to determine whether the users included in the list of connections are also users of the media system 100. This can be done, for example, by looking for matches between the user names, or other user information that may be available such as birthdates, user ID numbers, addresses, e-mail addresses, telephone numbers, and the like. The transmission of any such personally identifying information between the social media system 160 and the media system 100 is only provided with approval of the first user and as expressly permitted by the first user's connections as defined by privacy settings selected by them.

Taste profile database 274 stores taste profile information for the first user and other users of the media system 100. User taste profiles are typically determined based at least in part on the user listening history (e.g., what songs the user has listened to in the past, or within a certain time period). The listening history of the user may take into consideration the songs, artists, genres, and other similar attributes of the media content items that the user consumes. In some embodiments the user taste profile is defined as a vector in a multi-dimensional vector space, such as generated by the vector space application.

One of the drawbacks of relying on listening history to generate a taste profile is that it may not be possible to generate a taste profile of a new user of the media system 100 until the user has consumed sufficient content to begin to determine that user's taste profile. This may require hours, or days of user activity before the taste profile can be generated. Therefore, one alternative for users that do not have a sufficient quantity of listening history is to conduct an onboarding process in which the user provides input to the media system 100 to allow the media system 100 to generate an initial taste profile. This can be done even before the user has consumed any media content in the media system 100, or anytime thereafter. The input provided can be used to generate a taste profile, or to improve an already existing taste profile. In one example, the onboarding process presents to the user an onboarding questionnaire.

An onboarding questionnaire presents a series of questions to the user, and the answers allow the media system 100 to generate an initial taste profile for the user. The questions can ask the user, for example, to identify which artists, genres, albums, etc. are the user's favorite. Other questions may include information about the user, such as age, location, etc., which help to determine what type of content the user is more than likely to enjoy.

The vector space application 276 receives user taste profile information and media content item information, and uses this information to generate vectors within a multi-dimensional vector space that represent characteristics of users tastes or media content items. In this way, a user taste profile of the first user can be generated based either on listening history or the onboarding questionnaire, or other factors, and similarly taste profile vectors can also be generated for any other user, such as each of the first user's social connections. The vector space application 276 is also operable to compute similarity scores between users within the vector space, such as by using a cosine similarity or cosine distance calculation Each of the user device 102 and the media delivery system 150 can include additional physical computer or hardware resources. In at least some embodiments, the user device 102 communicates with the media delivery system 150 via the network 110.

Although in FIG. 2 only a single user device 102 and media delivery system 150 are shown, in accordance with some embodiments, the media-delivery system 230 can support the simultaneous use of multiple media-playback devices, and the media-playback device can simultaneously access media content from multiple media-delivery systems. Additionally, although FIG. 2 illustrates a streaming media based system for media playback, other embodiments are possible as well. For example, in some embodiments, the user device 102 includes a media data store 242 and the user device 102 is configured to select and playback media content items without accessing the media-delivery system 230. Further, in some embodiments, the user device 102 operates to store previously streamed media content items in a local media data store (e.g., the media content cache 214).

In at least some embodiments, the media delivery system 150 can be used to stream, progressively download, download, or otherwise communicate music, other audio, video, or other forms of media content items to the user device 102 for playback during travel on the user device 102. In accordance with an embodiment, a user U can direct input 296 to the user interface 204 to issue requests, for example, to create a friends playlist for playback on the user device 102.

Figure 3:
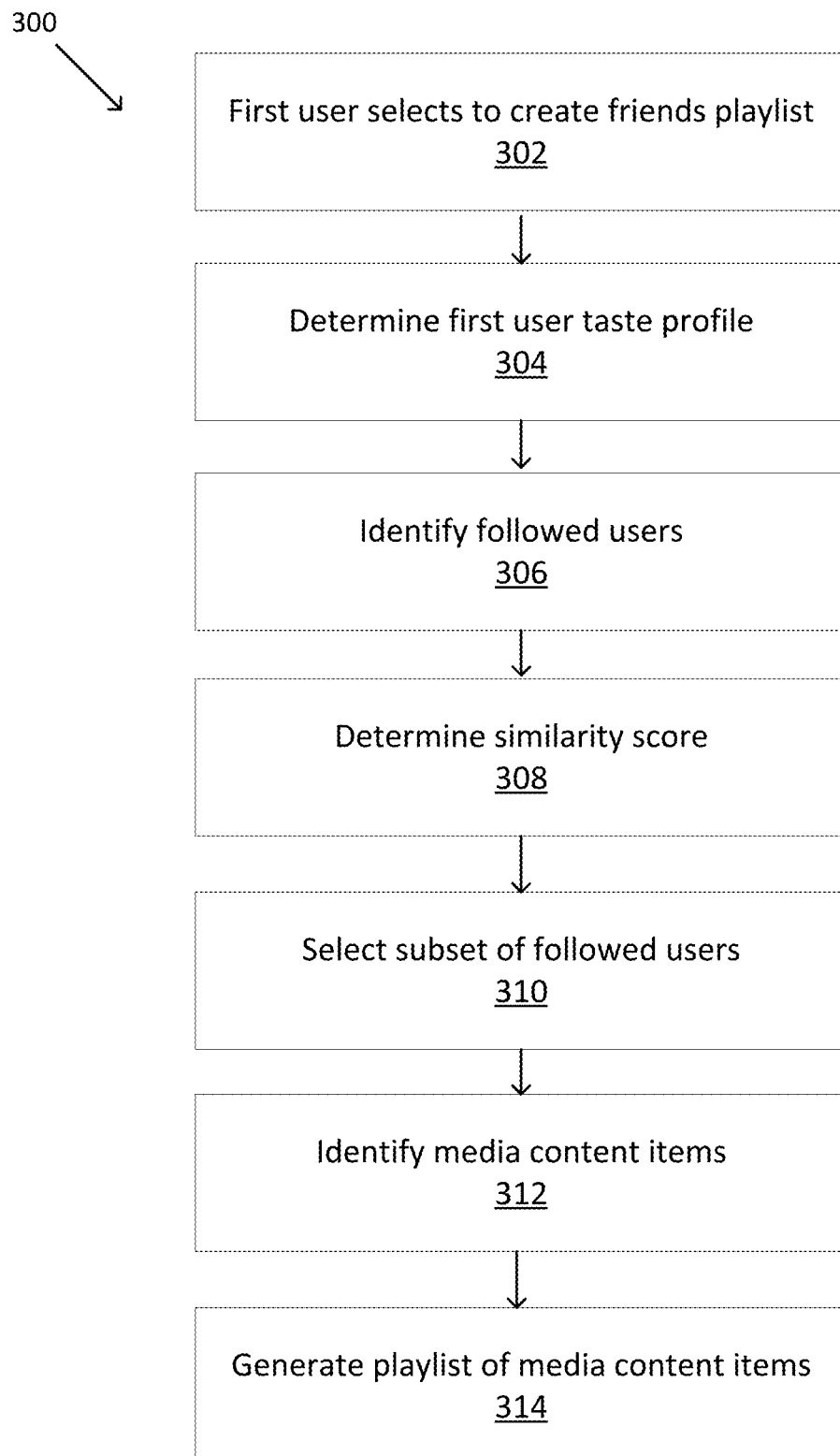
FIG. 3 illustrates an example method of generating a friends playlist.

FIG. 3 illustrates an example method 300 of generating a friends playlist comprising media content items selected based on listening history of social connections. In this example, the method 300 includes operations 302, 304, 306, 308, 310, 312, and 314. Other embodiments can have more or fewer operations.

At operation 302, the media system 100 receives an input from the first user selecting to generate and/or play a friends playlist.

At operation 304, a first user taste profile is determined, such as from the taste profile database 274, shown in FIG. 3. The first user taste profile may be determined in a variety of ways. In one embodiment, the first user taste profile is determined based on the first user's listening history. In another embodiment, the first user taste profile is determined by receiving a selection of artists, genres, albums, songs, etc., that the user has selected as categories that the user enjoys, such as through an onboarding process and questionnaire. Combinations of these or other processes can also be used.

In some embodiments, the user taste profile represents characteristics of the user's listening history (e.g., characteristics of the songs the user has listened to), such as user preferences and historical information about the user's consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via the user device 102, or other media plays, such as websites visited, book titles, movies watched, playing activity during a movie or other presentations, ratings, or terms corresponding to the media, such as "comedy", "relaxing", etc.

In addition, the user taste profile can include other information. For example, the user taste profile can include libraries and/or playlists of media content items associated with the first user.

A user taste profile can be associated with a user and used to maintain an in-depth understanding of the music activity and preference of that user, enabling personalized recommendations, taste profiling, and a wide range of social music applications. Libraries and wrappers can be accessed to create user taste profiles from a media library of the user, social website activity and other specialized databases to further identify music preferences.

At operation 306, a plurality of social connections are identified.

In some embodiments the social connections include users in which the first user has a personal relationship with, such as friends, colleagues, classmates, or other personal associations. In other embodiments, the connections can be based on other relationships, such as between two people that have not personally met, but at least the first user knows of the other user (such as in the case of a celebrity, artist, critic, or the like). In either case the users can be referred to as related users.

One way to identify social connections or other relationships between the first user and other users is to identify users that are followed by the first user within the media system 100. Following refers to a type of subscription in which the first user indicates that he or she would like to get additional content associated with that user, or that the first user would like that user to be included within the social connections used to generate the friends playlist 120. As described in further detail herein, in some embodiments followed users are the social connections that are used to generate the friends playlist 120. Followed users can be people or other entities that have an account within the media system 100, such as producers, record companies, or other businesses or entities. Relationships can be similarly identified by other connections between users, such as users that are liked by the first user, users that are saved by a first user, etc.

Another way to identify social connections is to import a list of social connections. The social connections can be imported from a social media system 160 as described with reference to FIG. 2, or from another source such as a contact list.

In some embodiments a certain minimum number of social connections may be needed to generate the friends playlist 120. If the first user does not follow or have connections with any other users on the media streaming service or if the first user does not follow enough other users, the first user is notified that more users need to be followed. In some embodiments, and as described in more detail at FIG. 4, the first user is then prompted to select more users to follow. In another possible embodiment, friends of the first user imported from a social media system are automatically followed within the media system 100, without requiring the user to manually select each user to follow.

At operation 308, a similarity score is determined. A similarity score is a representation of how similar the first user taste profile is to the user taste profile of the followed users. The similarity score is used to predict how well the first user will enjoy the media content items consumed by the followed users. Calculating a similarity score may be done in various ways, such as by determining a difference between taste profile vectors when plotted in a vector space using the vector space application. For example, a cosine distance or cosine similarity function can be used to compute the similarity score.

In a first example, a first user taste profile vector is created. Then, a user taste profile vector is created for each followed user. The user taste profile vectors are plotted in a vector space. The vectors may have any number of components (e.g., 20 dimensions, 40 dimensions, or 100 dimensions). The inner product (or dot product) of two vectors is the product of their lengths times the cosine of the angle between the vectors. The dot product (or cosine value) is calculated between the first user taste profile vector and each individual media content item vector.

In some embodiments, the similarity score is computed as the cosine similarity value, so a high similarity score indicates a higher probability that the first user enjoys the same type of media that the followed user enjoys. User taste profile vectors with a high cosine value are vectors within the vector space located close to the first user taste profile vector. In an embodiment, a list of followed users is generated and ranked in order from higher similarity scores (cosine values) to lower similarity scores (cosine values). In another embodiment, a list of followed users is created based on a randomly selected group, or based on other factors At operation 310, a subset of the followed users is selected. In one embodiment, the subset of followed users is selected based on the similarity score. In a first example, only the followed users with a similarity score above a threshold are selected for the subset. A threshold score may be a similarity score of 0.5 (a 50% user taste profile match), or a similarity score of 0.75 (a 75% user taste profile match), or a similarity score of 0.8 (an 80% user taste profile match). In another example, the similarity score is directly related to the cosine value, so media content items are given values ranging from −1 to 1. Media content items having a score less than, for example, 0.3 are excluded from the playlist. In another example, media content items with a score less than 0 are excluded. In another example, a specified quantity of followed users with the highest similarity scores are selected in the subset. The specified quantity can be in a range from about 3 to about 10, for example, such as 5. Other quantities can be selected in other embodiments. In yet another example, a subset of followed users is randomly selected, regardless of the similarity score. Other factors can also or alternatively be considered to determine the subset of the followed users.

At operation 312, a plurality of media content items are identified. The plurality of media content items are selected from the media content items consumed by the users of the subset of followed users. In an embodiment, a limited number of media content items are selected. The number of media content items may be limited in total, may be limited in the number of items selected from each followed user, or both. The number of media content items may be limited at, for example, 100 media contents items or 10 media content items per followed user within the subset.

The plurality of media content items can be selected based on various factors. One factor can be the number of times that a user of the subset of users has consumed the media content items, where greater quantities are ranked higher than lesser quantities. Another factor can be a rating given to the media content item by the user of the subset of users, where a higher rating is ranked higher than lower ratings. Another factor can be whether the user has recently indicated that he or she likes or has saved a new media content item to his or library. Alternatively, the identified media content items may be media content items that at least one of the users of the subset of users have consumed at least once. Each of the factors can be analyzed over a specified period of time, such as during the past week or during the past month, so that only recent activity is considered, or a user's entire listening history can be evaluated.

In an example, all the media content items that a followed user listens to are compiled into a list. This process is repeated for each related user in the subset until a complete list of candidate media content items is created. In an example embodiment, media content items that have appeared on a previously generated friends playlist 120 are removed from (or otherwise not included in) the list of candidate media content items, so that new media content items are presented each time the friends playlist 120 is generated. In some embodiments the list of candidate media content items includes 250, 500, 750, or more than 1000 media content items. In some embodiments, if the initial list is too large, the list can be reduced to the desired number, such as by randomly selecting the desired number, applying a time period limitation (e.g., limiting to the most recently consumed media content items) or by other ranking or filtering steps.

At operation 314, the friends playlist 120 of media content items is generated. The playlist is configured to update periodically. For example, the playlist may update every week, month, or multiple months, as discussed above. Each time the playlist updates, the system includes a set of new media content items, e.g., media content items that have not been on a previous playlist. In some embodiments a time limitation is imposed on repeating content, such that the playlist may not repeat media content items within six months, one year, or ever, for example In one example, the playlist is generated by selecting a plurality of unique media content items, such as in a range from 15 to 40 media content items, from the list of candidate media content items. Other embodiments can have other quantities of media content items.

In some embodiments one or more additional rules can be applied to the media content items included in the playlist, and to the arrangement of the media content items within the playlist. In an example embodiment, the playlist is configured to include no more than, a certain quantity (for example, three) of media content items from the same artist. The media content items from the same artist may be configured to not be arranged sequentially in the playlist. For example, the media content items by the same artist may be arranged with at least a certain quantity (e.g., eight) other media content items in between. Other rules can be applied to adjust the order or selection of the media content items.

In some embodiments a new friends playlist 120 of different media content items is generated periodically. For example, a new playlist may be generated every week, month, or other time period. In another example, a new playlist may be created any time that the first user requests to have a new playlist created, such as by selecting an option to generate a new friends playlist 120 from the user interface.

Figure 4:
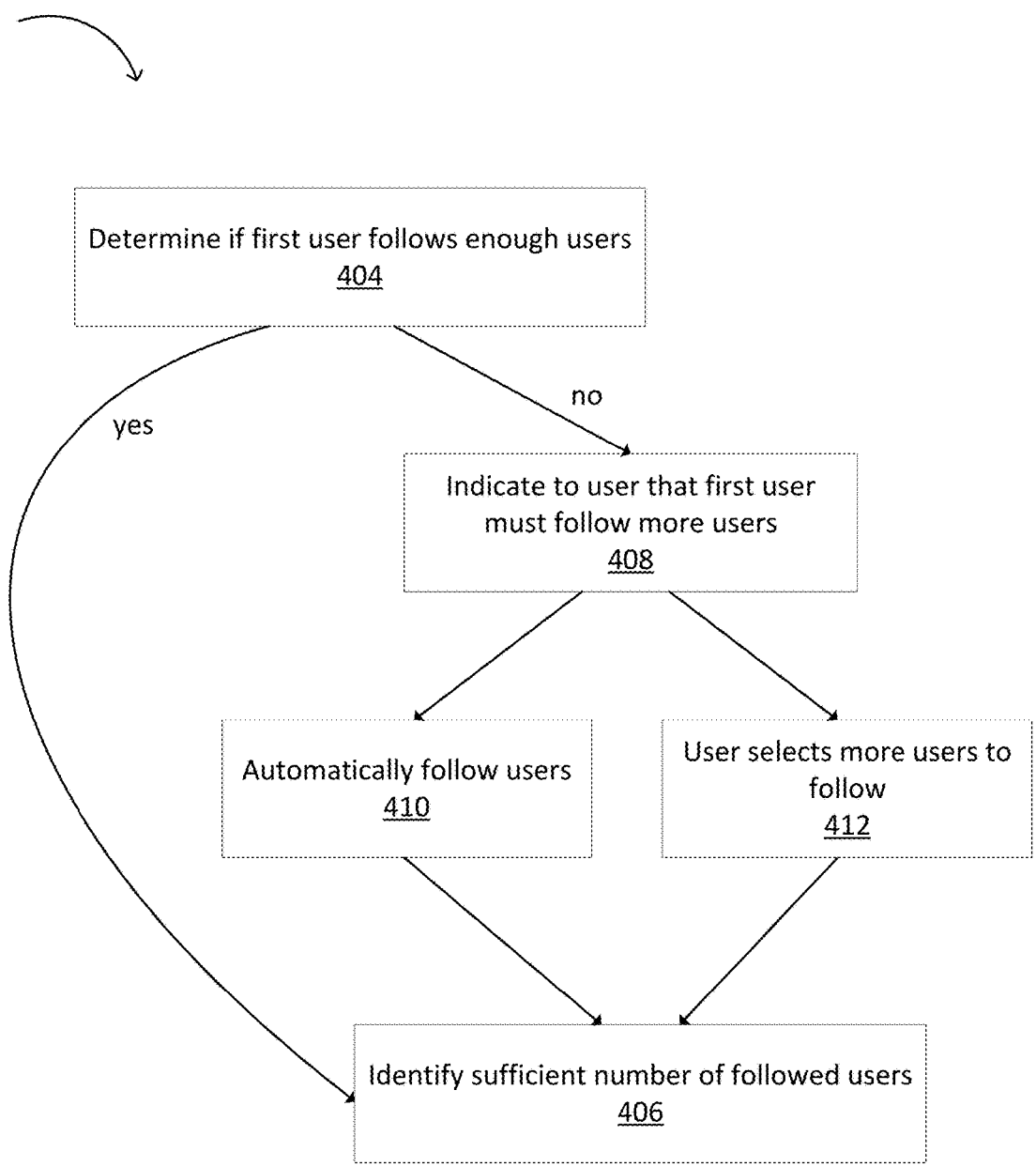
FIG. 4 is a flow chart illustrating an example method of identifying social connections to be used in generating a friends playlist.

FIG. 4 is a flow chart illustrating an example method 306 of identifying social connections to be used in generating a friends playlist, which is also an example of the operation 306 shown in FIG. 3. In the illustrated example, the method 306 includes operations 404, 406, 408, 410, and 412.

The method 306 can be performed after the first user elects to generate or play a friends playlist 120 (operation 302, FIG. 3), for example. In an example, the first user navigates to a particular page on a user interface of the media system 100 (FIG. 1) and selects to play a friends playlist 120. In another example, the method 304 can be performed in advance of interaction with the first user.

At operation 404, a determination is made as to whether or not the first user has a sufficient number of social connections, such as by determining whether the first user follows sufficient number of other users. In one example a sufficient number is greater than or equal to a threshold number of users. In an embodiment, a threshold number of users can be in a range from 3 to 20, such as at least five, ten, or twenty users. A threshold number of users represents a minimum number of users needed to generate the friends playlist 120. Although it would be possible to generate the friends playlist 120 based on only a single social connection, it is preferred that multiple social connections be available.

If the user follows at least the threshold number of users, then at operation 406, a sufficient number of followed users is identified.

If the user does not follow at least the threshold number of users, then at operation 408, the media system 100 indicates to the first user that the first user must follow more users in order to generate and/or play the friends playlist 120. The first user may be presented with different options to allow the first user to follow additional users, such as by prompting the first user to select or search for more users to follow or to find additional social connections by importing social connections from a social media system.

At operation 410, if the first user does not follow enough users, social connections from a social media system (e.g., 160, FIG. 2) can be imported into the media system 100 to identify the first user's social connections within the media system 100. The importing process can include linking the first user's account within the media system 100 with a social media account of a social media system. Many social media systems can be used, such as Facebook®, Instagram®, Pinterest®, LinkedIn®, and the like. In some embodiments the linking process involves having the user login to the social media system, and then prompting the user to authorize the social media system to send the list of social connections to the media system 100, and simultaneously authorizing the media system 100 to receive such information. Only upon express approval of the first user is the information transferred.

Other lists of connections can alternatively be used, such as by utilizing a user's contact list.

As discussed previously, a matching process can then be used to match the users of the social media system with the users of the media system 100, such as to determine which of the first user's social connections are also users of the media system 100 (since it is possible that not all of the social connections have an account in the media system 100). Those that are identified as having an account are added to a list of social connections for the first user.

Because many people have a large number of social connections, it can be time consuming and laborious to require the first user to manually identify each of his or her social connections that the first user would like to follow for purposes of generating the friends playlist. Accordingly, in some embodiments the first user's social contacts are initially all followed by default. This allows the friends playlist to be generated and made available to the user much more quickly, without having to wait for the user to do the manual selection process. In fact, in many cases if the user were asked to perform the manual selection process before utilizing the friends playlist 120, many users would never choose to do so, and therefore would never be able to enjoy the friends playlist 120. Therefore, the automated following process greatly reduces the time required before the friends playlist 120 can be generated, and increases the availability of the playlist to users. In some embodiments the automatic following occurs without any additional input from the user once the list of social connections has been obtained.

Alternatively, at operation 412, the first user is presented with a list of friends imported from the social media system or other users on the media streaming service to select to follow. The list of friends is taken from an associated social media application that the first user has linked to the media streaming service. The list of friends may be presented to the first user in a particular order, or in a random order. In a first embodiment, a particular order lists the related users ranked by the similarity of that user's taste profile to the first user's taste profile (such as using the taste profile database 274 and vector space application 276, described with reference to FIG. 2). In another embodiment, the particular order lists friends in alphabetical order.

In some embodiments the operation 412 is available to the user as an optional process following operation 410. Although many users will prefer an automated process as described above, some users will with to fine tune or manually select the social connections that are followed. Therefore, the operation 412 can be presented to such users to allow the user to follow or unfollow users from the social connections.

Upon completion of operations 410 and/or 412 the operation 406 is performed to determine that a sufficient number of users have been followed and to identify those users. If a sufficient number are still not available, the process returns to operation 408.

In some embodiments users may have a large number of social connections, and the automated following of such users results in a large number of followed users, which may be undesired for generating the friends playlist 120, and instead a smaller subset of the followed users is preferred (310, FIG. 3). One way to select the subset of followed users is to compare and rank the followed users by similarity scores generated based on a comparison of the first user taste profile with the followed users taste profiles, and then to select a subset with the highest similarity scores. In some embodiments the taste profiles of followed users are only used with permission from those users, such as can be controlled by privacy settings, such as illustrated and described in further detail with reference to FIG. 8.

Figure 5:
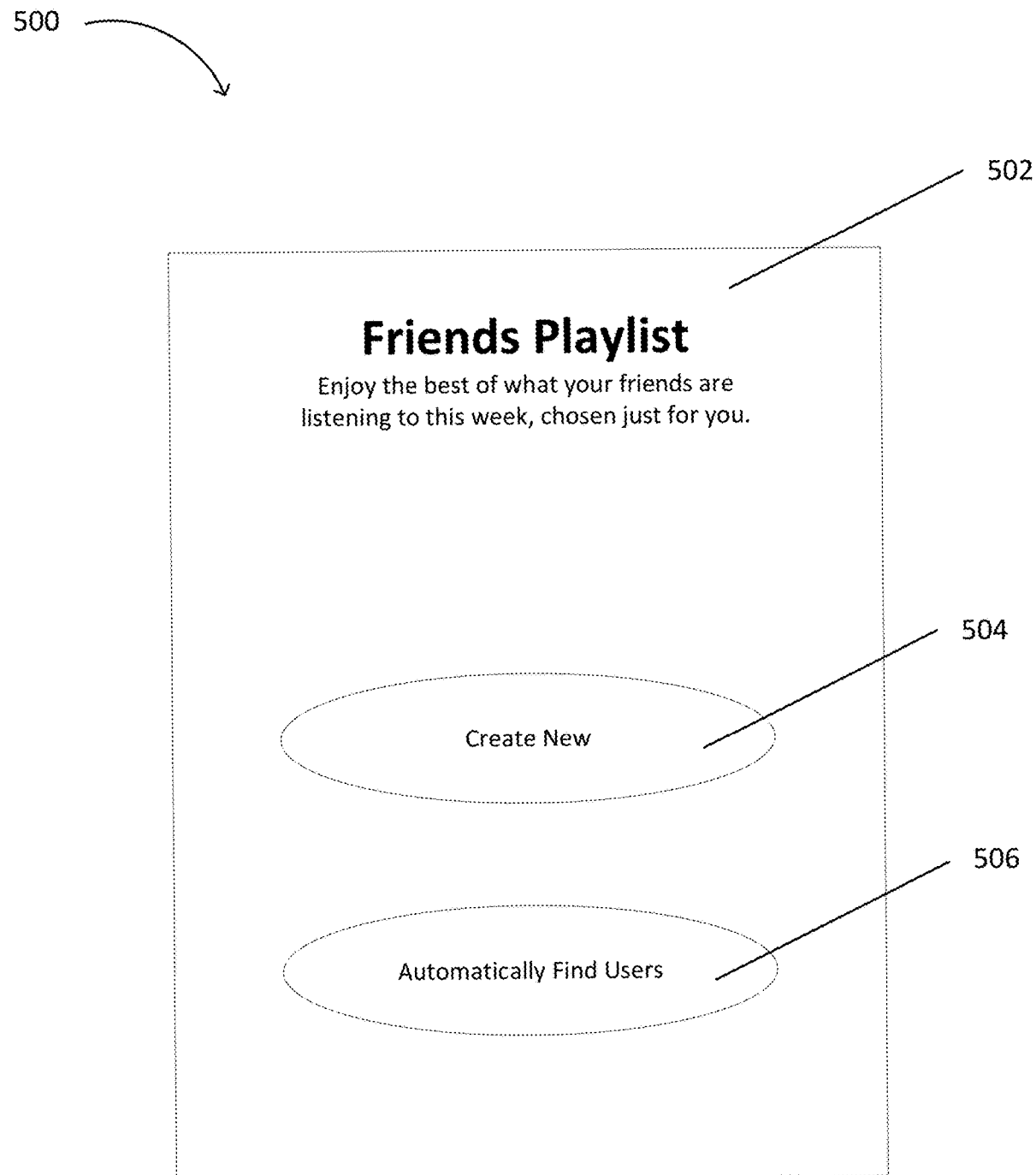
FIG. 5 shows an example user interface for requesting a periodic playlist.

FIG. 5 illustrates an example user interface 500 for requesting a friends playlist. The example user interface 500 includes a title 502, which indicates to the user what the playlist includes and generally how it is implemented. The title 502 is selectable to initiate the generation of and/or playback of the friends playlist 120. The first user may also be presented with options to create the friends playlist, such as using the buttons 504 or 506. In some embodiments, all buttons are presented to the first user. In other embodiments, not all the buttons are presented to a first user, for example, if the first user does not follow enough related users.

A button 504, allows a first user to create a new friends playlist. This assumes that the first user follows enough users to create the playlist. If a first user does not follow enough users, then this button 504 may not be presented to the first user. In another embodiment, the button 504 is presented to the first user even if the first user does not follow enough users. After selecting button 504, the first user would be prompted to follow more users on a subsequently presented user interface.

Button 506 allow a first user to elect to automatically find and follow users. In an example, all friends on a social media system of the first user, who are users of the media streaming service are followed by the first user, as described herein.

Figure 6:
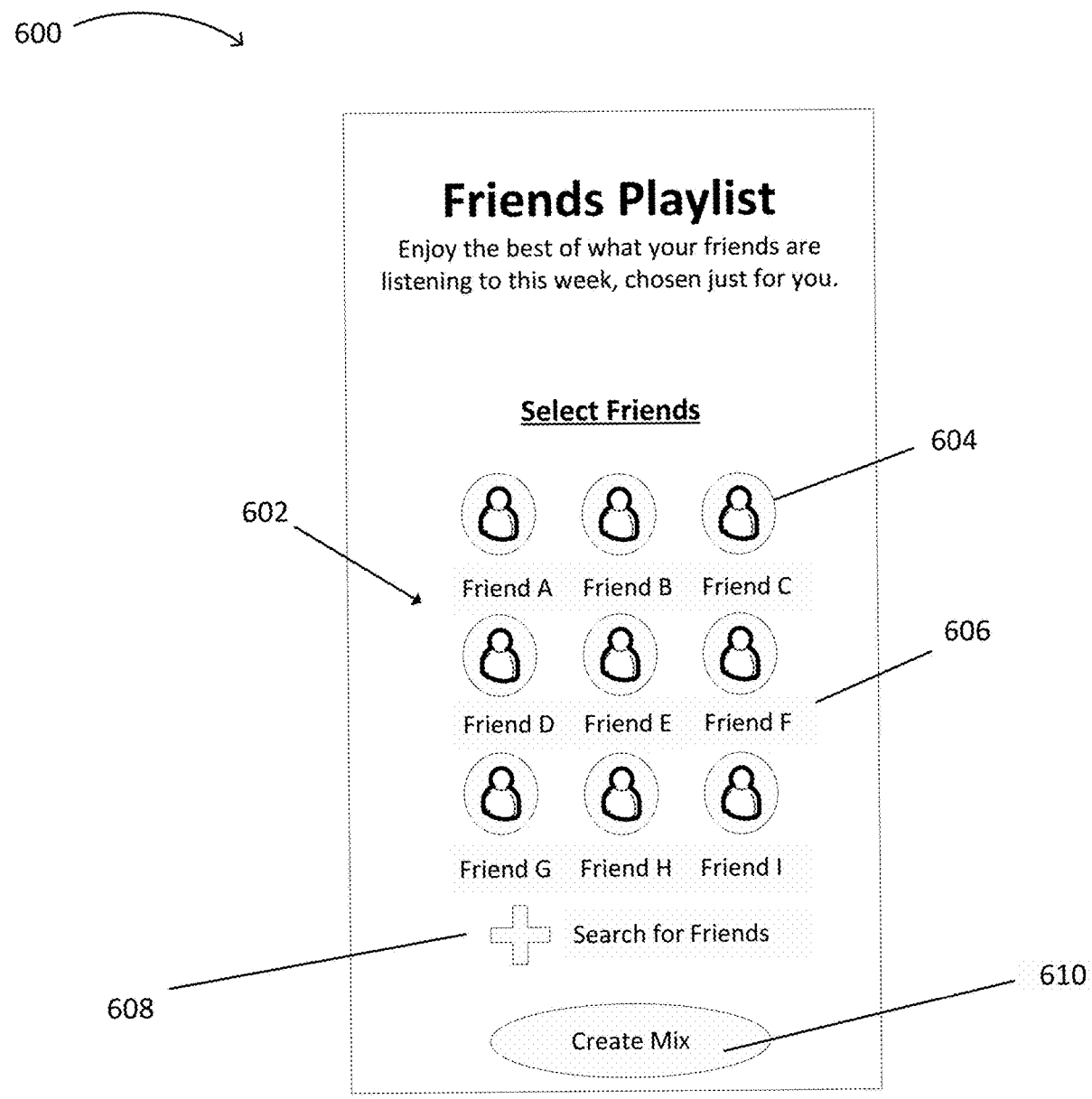
FIG. 6 shows an example user interface for selecting followers to create a friends playlist.

FIG. 6 shows an example user interface for selecting users to follow to create a friends playlist. A list of social connections 602 is presented to the first user, the list of social connections shown typically including only those social connections who also have an account with the media system 100. Each social connection may include an icon 604, such as a picture of the user and their name 606. In an embodiment, only a portion of social connections are presented, such as the users with the most similar user taste profile. In another embodiment, all social connections are presented to the first user. The social connections may be listed in order of user taste profile similarity, alphabetical order, or a random order. Button 608 allows a first user to search for other social connections that are not included in the list of social connections 602. When the first user is done selecting users to follow, the create mix button 610 is selected. The create mix button 610 is only available when the first user follows enough other users.

Figure 7:
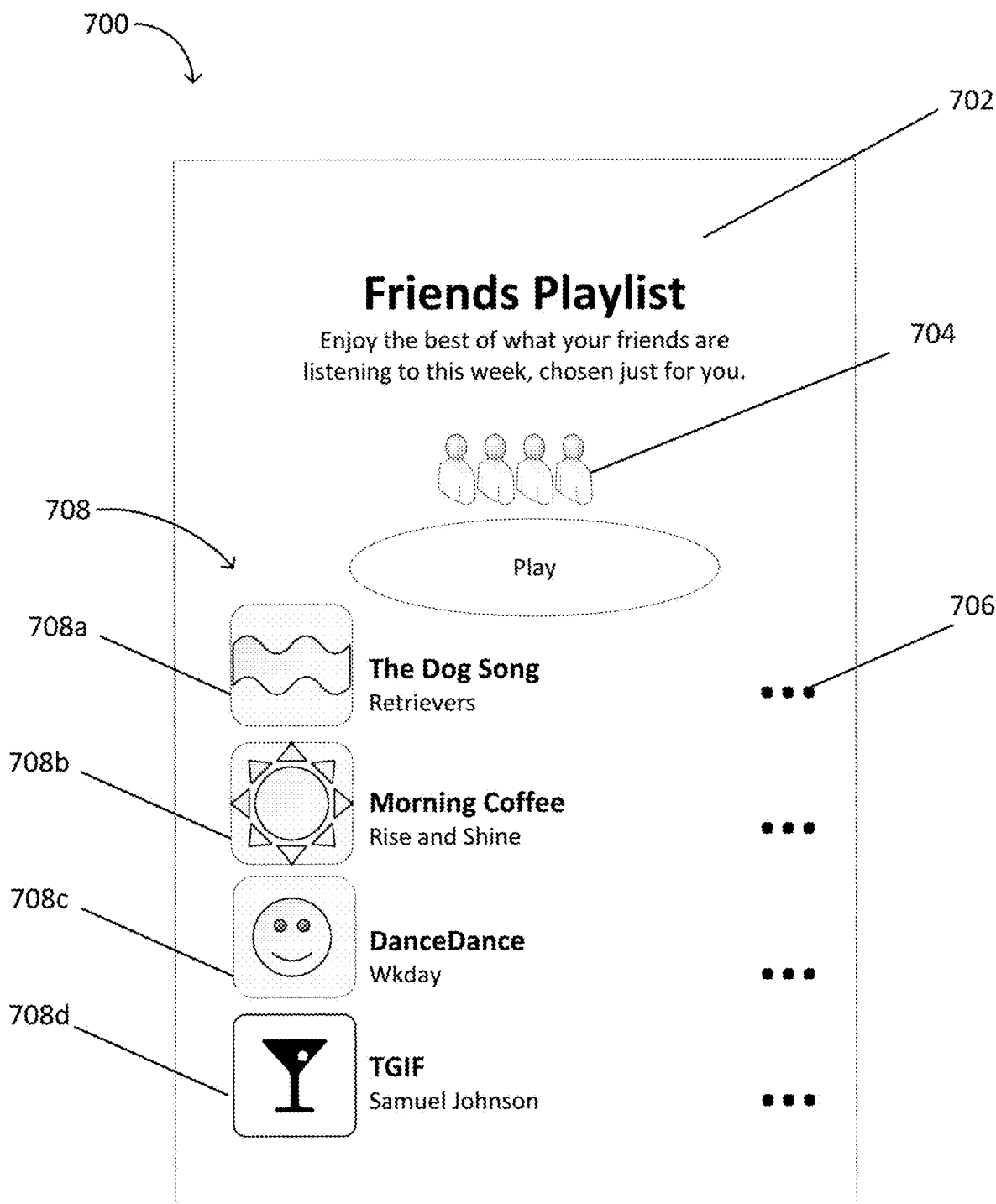
FIG. 7 shows an example user interface for an example friends playlist.

FIG. 7 shows an example user interface 700 for an example friends playlist 120. The user interface 700 includes a title bar 702. The title 702 identifies the friends playlist that is currently presented, and may include other information, such as a date created, or other identifying information. A list of social connections used to create the playlist is shown at icons 704.

A list of media content items 708 is shown on user interface 700. In an example, a list of songs 708a, 708b, 708c, 708d is shown. Additionally, more information may be obtained for each media content items by selecting overflow menu 706. In addition, the user interface 700 may include an overflow menu 706 that allows a user to save songs, favorite songs, or remove songs Information presented may include metadata about the media content item itself, as well as which related users provided the item.

FIG. 8 shows an example user interface 800 of settings options 802 for the media system 100. Settings options 802 includes options such as connecting your device option 810, private session option 812, listening activity option 804, and connect to a social media system option 806. Each option includes a selectable control having a disabled setting 810 and an enabled setting 812.

Listening activity option 804 allows a user to share their listening activity and what the user has listened to with followers. In order for a user to be included as a followed user and have their media content items identified to create the friends playlist, the user needs to enable this privacy setting. If a user does not want to share his or her listening history, and disables this privacy setting, the media content items that the user consumes are not utilized to generate the friends playlist. In an example, when a user has disabled the listening activity option 804 privacy setting, that user is excluded from the subset of followed users. In another example, when a user has disabled the listening activity option 804 privacy setting, that user may be included in the subset of followed users, but media content items are not identified from that user.

Connect to a social media system option 806 allows a user of the media streaming service to link to a social media system. When this privacy setting is enabled, a user enables the media streaming service to import a friends list from a social media system, as described herein. When this privacy setting is disabled, a user does not enable the media streaming service to import a friends list from a social media system. If the privacy setting is disabled, a user may not be able to create a friend playlist unless the user follows enough users. If the user needs to follow more users in order to create a friends playlist, the user may be prompted to enable this privacy setting.

The option 812 allows the user to have a private session. When this option is selected, media content consumed by the user is not stored in the user's listening history. Therefore, any other steps that utilize the listening history (such as determining a user taste profile, and selecting media content items from the user's listening history) are not influenced by and do not include any of the media content items consumed during the private session.

Figure 10:
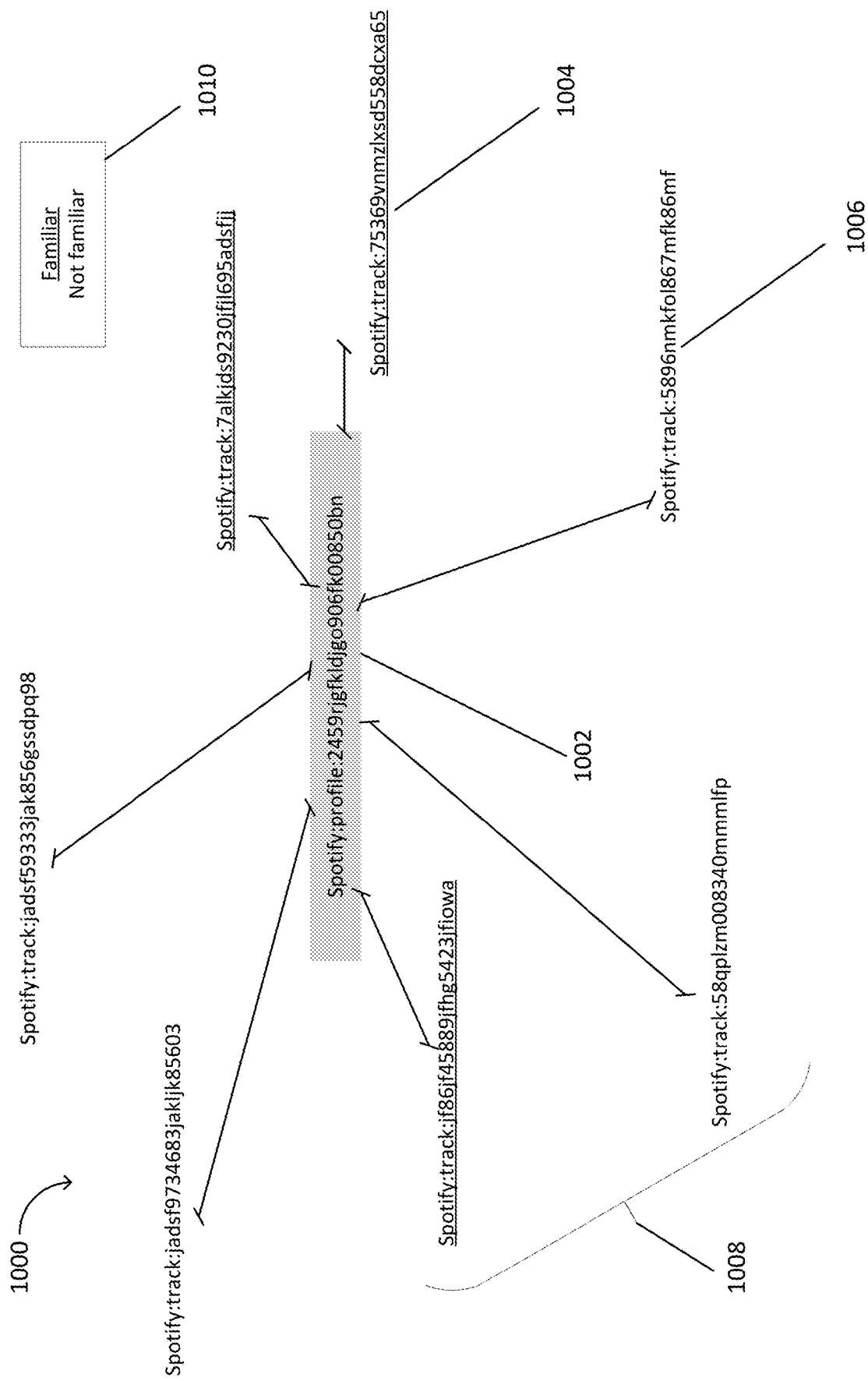
FIG. 10 illustrates an example embodiment of tracks arranged by cosine distance and an indication of a familiarity status.

FIGS. 9-11 illustrate additional details that may be incorporated with the embodiments of creating a friends playlist as described above. For example, methods of identifying media content items and selecting media content items are described in further detail below.

FIG. 9 illustrates an example list 900 of media content items that have been identified from the subset of followed users. An activity score is calculated, which represents the popularity of each of the media content items. The activity score is a weighted score from 0-100, which quantifies the popularity of media content items. Factors used to calculate the activity score include overall plays, unique track listeners, and unique artist listeners.

Each media content item includes an activity score 902. The list 900 comprises media content items with a track identifier 902, a number of overall plays 904, unique track listeners 906, and an activity score 908. The number of overall plays 904 is the number of times the media content item has been played throughout the media streaming service. The unique track listeners 906 is the number of different users that have consumed the media content items. The activity score 908 is a calculation that produces a score from 0-100, which takes into account factors such as number of overall plays and unique track listeners. Other factors that may influence the activity score 908 include unique artist listeners (not shown). In an example, the top 1000 media content items with the highest activity scores 908 are selected to continue through the playlist creation process.

FIG. 10 illustrates a vector space 1000 comprising media content item vectors 1008 with an associated familiarity score threshold indicator 1010. The vector space 1000 may be the same vector space used to calculate the similarity score, in that it includes a first vector representing a first user taste profile vector 1002. The vector space 1000 may also include the same vectors 1008 representing each media content item. Alternatively, a new vector space may be created, which is described below.

The media content item vectors 1008 closest to the first user taste profile vector 1002 will be given a high familiarity score. A high familiarity score represents media content items that the first user is most likely to be familiar with. The media content item vectors 1008 furthest away from the first user taste profile vector 1002 are given a low familiarity score. A low familiarity score represents media content items that the first user is most likely not familiar with. For example, media content items with a low familiarity score may be items that the first user has never consumed before, or only consumed a single time or a few times.

Media content items with a familiarity score above a predetermined threshold are indicated in the vector space 1000. High familiarity score vectors 1004 are located near the first user taste profile vector 1002. Low familiarity score vectors 1006 are located further away from the first user taste profile vector 1002.

In an example, a playlist contains a mixture of media content items that includes both familiar and unfamiliar media content items. In an example, the playlist may include a ratio of familiar to discovery media content items of from 10:1, or 8:1, or 6:1. Alternatively, the playlist may include a ratio of discovery to familiar media content items of from 10:1, or 8:1, or 6:1. Providing unfamiliar tracks allows the first user to be introduced to new media content items.

FIG. 11 illustrates an example results table 1100 from the vector space of FIG. 10. Instead of being arranged in a multi-dimensional vector space, the media content items are lists in order of familiarity score 1106 and personalization score 1104. The results table 1100 is configured to identify one or more media content items (i.e., tracks) by track identifiers 1102.

The media content items with a high familiar score are listed first and then in descending order. Further, the personalization score 1104 is listed. The results table 1100 also indicates whether each media content item is a repeat or is one of too many media content items listed by the same artist. If the media content item is a repeat or one of too many items by the same artist, the column 1108 indicates "YES," which means the media content item will not be included in the final playlist.

In an example, the playlist is configured to include anywhere from 15-40 unique media content items. The playlist is also configured to include no more than, for example, three media content items from the same artist. The media content items from the same artist may be configured to not be arranged sequentially in the playlist. For example, the media content items by the same artist may be arranged with at least eight other media content items in between. In other embodiments, more or less than eight media content items may be in between media content items by the same artist.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A method of generating a queue of media content items on a media delivery system from listening histories of social connections, for playback to a first user using a user device, the method comprising:
receiving a friends list of the first user from a social media system, the friends list comprising a plurality of first user connections who have elected to be discoverable via a social connection privacy setting;
determining a user subgroup from the friends list that includes users of the media delivery system;
automatically adding the user subgroup as followed users of the first user in the media delivery system;
determining a first user taste profile;
determining user taste profiles for the followed users, the user taste profiles being generated based at least in part on a listening history of the respective followed user;
comparing the first user taste profile with the user taste profiles of the followed users to generate similarity scores representing how similar the first user taste profile is to the user taste profiles of the followed users;
selecting a subset of followed users based on the similarity scores;
identifying a plurality of media content items from the listening histories of the subset of followed users; and
generating the queue of media content items selected from the plurality of media content items.

2. The method of claim 1, further comprising receiving the friends list of the first user from the social media system is based on a first user privacy setting electing to connect to the social media system.

3. The method of claim 1, further comprising receiving the friends list of the first user from the social media system in response to determining the first user does not have enough followed users to generate the queue of media content items.

4. The method of claim 1, further comprising:
determining the first user does not have enough followed users to generate the queue of media content items; and
prompting the first user to select an additional user to follow.

5. The method of claim 1, further comprising determining user taste profiles of the followed users who have elected to share their listening history.

6. The method of claim 1, further comprising receiving the friends list of the first user from the social media system in response to receiving a first user selection to connect to the social media system.

7. The method of claim 1, further comprising:
receiving a selection to add a followed user to the subset of followed users;
identifying an updated plurality of media content items from the listening histories of the subset of followed users; and
generating an updated queue of media content items selected from the plurality of media content items.

8. The method of claim 1, further comprising:
receiving a selection to remove a followed user from the subset of followed users;
identifying an updated plurality of media content items from the listening histories of the subset of followed users; and
generating an updated queue of media content items selected from the plurality of media content items.

9. A media system comprising at least one processing device and at least one non-transitory computer-readable medium storing data instructions that, when executed by the at least one processing device, cause the media system to:
receive a friends list of a first user from a social media system, the friends list comprising a plurality of first user connections who have elected to be discoverable via a social connection privacy setting;
determine a user subgroup from the friends list that includes users of the media system;
automatically add the user subgroup as followed users of the first user in the media system;
determine a first user taste profile;
determine user taste profiles for the followed users, the user taste profiles being generated based at least in part on a listening history of the respective followed user;
compare the first user taste profile with the user taste profiles of the followed users to generate similarity scores representing how similar the first user taste profile is to the user taste profiles of the followed users;
select a subset of followed users based on the similarity scores;
identify a plurality of media content items from listening histories of the subset of followed users; and
generate a queue of media content items selected from the plurality of media content items.

10. The media system of claim 9, further comprising data instructions that, when executed by the at least one processing device, cause the media system to generate a user interface comprising a selectable list of followed users.

11. The media system of claim 10, wherein the selectable list is ordered based on the similarity scores.

12. The media system of claim 10, wherein the selectable list is ordered alphabetically based on a name of each followed user.

13. The media system of claim 10, further comprising data instructions that, when executed by the at least one processing device, cause the media system to:
receive a selection to add a followed user to the subset of followed users;
identify an updated plurality of media content items from the listening histories of the subset of followed users; and
generate an updated queue of media content items selected from the plurality of media content items.

14. The media system of claim 10, further comprising data instructions that, when executed by the at least one media processing device, cause the system to:
receive a selection to remove a followed user from the subset of followed users;
identify an updated plurality of media content items from the listening histories of the subset of followed users; and
generate an updated queue of media content items selected from the plurality of media content items.

15. The media system of claim 10, wherein the user interface further comprises a search button for searching for users of the media system.

16. The media system of claim 15, further comprising data instructions that, when executed by the at least one processing device, cause the media system to:
receive a selection of a user of the media system;
add the user of the media system to the followed users; and
display the user of the media system in the selectable list.

17. The media system of claim 16, further comprising data instructions that, when executed by the at least one processor, cause the media system to:
determine the first user does not have enough followed users to generate the queue of media content items; and
prompt the first user to select an additional user to follow using the search button.

18. The media system of claim 9, wherein:
the friends list is a first friends list;
the social media system is a first social media system;
the plurality of first user connections is a first plurality of user connections; and
the user subgroup is a first user subgroup; and
further comprising data instructions that, when executed by the at least one processing device, cause the media system to:
receive a second friends list of the first user from a second social media system, the second friends list comprising a second plurality of first user connections who have elected to be discoverable via the social connection privacy setting;
determine a second user subgroup from the second friends list that includes users of the media system; and
automatically add the second user subgroup as followed users of the first user in the media system.

19. A method of generating a queue of media content items on a media delivery system from social connections, for playback to a first user using a user device, the method comprising:

determining a first user taste profile;

receiving a friends list of the first user from a social media system, the friends list comprising a plurality of first user connections who have elected to be discoverable via a social connection privacy setting;

determining a user subgroup from the friends list that includes users of the media delivery system;

automatically adding the user subgroup as followed users of the first user in the media delivery system;

determining a followed user subgroup of the followed users that includes the followed users who have elected to share their listening histories;

determining user taste profiles for the followed user subgroup, the user taste profiles being generated based at least in part on a listening history of the respective followed user;

comparing the first user taste profile with the user taste profiles of the followed user subgroup to generate similarity scores representing how similar the first user taste profile is to the user taste profiles of the followed users in the followed user subgroup;

selecting a subset of followed users based on the similarity scores;

identifying a plurality of media content items from the listening histories of the subset of followed users; and generating the queue of media content items selected from the plurality of media content items.

20. The method of claim 19, further comprising linking a first user account of the media delivery system of with a first user account of the social media system.

* * * * *